(12) United States Patent
Anno et al.

(10) Patent No.: US 7,342,626 B2
(45) Date of Patent: Mar. 11, 2008

(54) DISPLAY DEVICE

(75) Inventors: Kouichi Anno, Mobara (JP); Hitoshi Komeno, Mobara (JP); Tomonori Nishino, Mobara (JP)

(73) Assignee: Hitachi Displays, Ltd., Mobara-Shi (JP)

( * ) Notice: Subject to any disclaimer, the term of this patent is extended or adjusted under 35 U.S.C. 154(b) by 11 days.

(21) Appl. No.: 11/495,634

(22) Filed: Jul. 31, 2006

(65) Prior Publication Data

US 2006/0262240 A1    Nov. 23, 2006

Related U.S. Application Data

(62) Division of application No. 10/629,631, filed on Jul. 30, 2003.

(30) Foreign Application Priority Data

Jul. 30, 2002    (JP)    .............................. 2002-221607

(51) Int. Cl.
    *G02F 1/136*    (2006.01)
    *G02F 1/1333*   (2006.01)
(52) U.S. Cl. ........................................ 349/114; 349/44
(58) Field of Classification Search ................ 349/44, 349/114, 110, 111
    See application file for complete search history.

(56) References Cited

U.S. PATENT DOCUMENTS

| | | | |
|---|---|---|---|
| 6,532,045 B2 | 3/2003 | Chung et al. | |
| 6,608,660 B1 | 8/2003 | Okamoto | |
| 6,697,138 B2 | 2/2004 | Ha et al. | |
| 6,850,297 B2 | 2/2005 | Takizawa | |
| 6,850,298 B2 | 2/2005 | Fujimori | |
| 6,862,059 B2 | 3/2005 | Murai et al. | |
| 6,879,359 B1 * | 4/2005 | Kikkawa et al. | 349/113 |
| 7,106,403 B2 * | 9/2006 | Murai et al. | 349/114 |

* cited by examiner

*Primary Examiner*—Toan Ton
(74) *Attorney, Agent, or Firm*—Antonelli, Terry, Stout & Kraus, LLP.

(57) ABSTRACT

The present invention prevents a frame-like luminance difference generated in a portion which surrounds a light transmissive region. In a pixel region formed on a substrate, a first pixel electrode formed of a light transmissive conductive layer is formed in one light transmissive region which is formed by partitioning the pixel region and a second pixel electrode formed of a non-light transmissive conductive film is formed on the other light reflective region. The first pixel electrode is positioned as a lower layer with respect to an insulation film. A hole is formed in the insulation film in a region corresponding to the light transmissive region so as to expose the first pixel electrode. The second pixel electrode is formed on a light reflective region of the insulation film. Light shielding is performed at a portion corresponding to a side wall surface of the hole formed in the insulation film.

4 Claims, 6 Drawing Sheets

DISPLAY DEVICE

CROSS REFERENCE TO RELATED APPLICATION

This application is a divisional application of U.S. application Ser. No. 10/629,631, filed Jul. 30, 2003, the contents of which are incorporated herein by reference.

BACKGROUND OF THE INVENTION

The present invention relates to a liquid crystal display device, and, more particularly, to a liquid crystal display device of the partial transmissive type, in which it is possible to eliminate a frame-like luminance difference around the periphery of the light transmissive region in each pixel.

A liquid crystal display device of the partial transmissive type is used as a miniaturized liquid crystal display device for a mobile telephone or the like. This liquid crystal display device allows a user to recognize images on a display screen using light made up of the reflective light of the sun (a light reflection mode) or using light from a backlight incorporated in the liquid crystal display device (a light transmissive mode), depending on the conditions existing at the locations where the liquid crystal display device is being used.

That is, in a typical liquid crystal display device, a pair of transparent substrates are arranged to face each other in an opposed manner with a liquid crystal layer disposed therebetween. On a liquid-crystal-side surface of one transparent substrate, regions which are defined by gate signal lines which extend in the x direction and are juxtaposed in the y direction and drain signal lines which extend in the y direction and are juxtaposed in the x direction constitute pixel regions. In each pixel region, there is a switching element, which is driven by supplying a scanning signal from one gate signal line, and there is a pixel electrode to which a video signal is supplied from one drain signal line through the switching element.

The pixel electrode is formed of a light transmissive conductive layer made of ITO (Indium-Tin-Oxide), for example, in one region of the pixel region, and it is formed of a non-light transmissive conductive layer, such as a metal layer made of Al or the like, in the remainder of the pixel region. An electric field is generated between the pixel electrode and a counter electrode, which is formed in common with respective pixel regions and is formed of a light transmissive conductive layer on a liquid-crystal-side surface of the other transparent substrate, whereby the liquid crystal within the pixel region is activated in response to the electric field. In this case, a portion of the pixel area in which the light transmissive pixel electrode is formed is used as a light transmissive region and a portion of the pixel area in which the non-light transmissive pixel electrode is formed is used as a light reflective region.

Further, in a liquid crystal display device having such a constitution, there is a known technique in which the pixel electrode formed of the light transmissive conductive layer is arranged below an insulation film, a hole is formed in the insulation film in a region corresponding to the light transmissive region so as to expose the pixel electrode formed of the light transmissive conductive layer, and a pixel electrode formed of the non-light transmissive conductive film is formed in a region above the insulation film and outside the light transmissive region, that is, in the light reflective region.

Here, the reason why the hole is formed in the region corresponding to the light transmissive region of the insulation film is to make the length of an optical path of light which passes through the liquid crystal in the light transmissive region substantially equal to the length of an optical path of light which passes through the liquid crystal in the light reflective region.

SUMMARY OF THE INVENTION

However, with respect to the liquid crystal display device having such a constitution, it has been found that a frame-like luminance difference is generated at the periphery of the hole formed in the insulation film (light transmissive region) at the time of image display.

As a result of an extensive study of the causes of such a phenomenon, it has been found that, since a steep stepped portion is formed at a portion corresponding to a side wall surface of the hole formed in the insulation film, a disturbance of the orientation of the liquid crystal is liable to be easily generated, whereby, at the time of producing a black display in the light transmissive mode, for example, a complete black display cannot be obtained in such a portion, thus giving rise to the above-mentioned drawback.

The present invention has been made in view of such circumstances, and it is an object of the present invention to provide a liquid crystal display device in which it is possible to prevent the generation of a frame-like luminance difference in a portion which surrounds the light transmissive region.

A summary of typical aspects of the invention disclosed in this specification is as follows.

Means 1.

In a liquid crystal display device according to the present invention, for example, in a pixel region formed on a substrate, a first pixel electrode formed of a light transmissive conductive layer is formed in one optical transmissive region, which is formed by partitioning the pixel region, and a second pixel electrode formed of a non-light transmissive conductive film is formed on the remainder of the pixel region, representing a light reflective region.

The first pixel electrode is positioned as a lower layer with respect to an insulation film, and, at the same time, a hole is formed in the insulation film in a region corresponding to the light transmissive region so as to expose the first pixel electrode, and a second pixel electrode is formed on a light reflective region of the insulation film, and at least a portion corresponding to a side wall surface of the hole formed in the insulation film is shielded from light.

Means 2.

The liquid crystal display device according to the present invention is, for example, on the premise of the constitution of means 1, characterized in that on one of a pair of substrates which are arranged to face each other in an opposed manner with liquid crystal disposed therebetween, the first pixel electrode and the second pixel electrode are formed, and, at the same time, a light shielding film, which is positioned below the insulation film, is provided to at least the portion corresponding to the side wall surface of the hole formed in the insulation film.

Means 3.

The liquid crystal display device according to the present invention is, for example, on the premise of the constitution of means 1, characterized in that on one of a pair of substrates which are arranged to face each other in an opposed manner with liquid crystal disposed therebetween, the first pixel electrode and the second pixel electrode are formed, and, at the same time, a light shielding film is provided to a portion corresponding to a side wall surface of a hole formed in the insulation film of the other substrate of the respective substrates.

Means 4.

The liquid crystal display device according to the present invention is, for example, characterized in that on one of the respective substrates which are arranged to face each other with liquid crystal disposed therebetween, a plurality of juxtaposed gate signal lines and a plurality of juxtaposed drain signal lines which cross the respective gate signal lines are formed, regions surrounded by these respective signal lines constitute pixel regions, and each pixel region includes a switching element which is operated in response to a scanning signal received from the gate signal line and a pixel electrode to which a video signal is supplied from the drain signal line through the switching element, the pixel electrode is constituted of a first pixel electrode formed of a light transmissive conductive layer formed in a light transmissive region which constitutes one region formed by partitioning the pixel region and a second pixel electrode formed of a non-light transmissive conductive film, which is formed of a light reflective filming in a region which constitutes the remaining region after partitioning the pixel region, the first pixel electrode is positioned as a lower layer with respect to an insulation film, a hole is formed in the insulation film in a region corresponding to the light transmissive region so as to expose the first pixel electrode, the second pixel electrode is formed in the light reflective region of the insulation film, and a light shielding film, which is positioned as a layer below the insulation film, is provided to at least a portion corresponding to a side wall surface of the hole formed in the insulation film.

Means 5.

The liquid crystal display device according to the present invention is, for example, on the premise of the constitution of means 4, characterized in that the light shielding film is made of a material similar to the material of the gate signal lines.

Means 6.

The liquid crystal display device according to the present invention is, for example, characterized in that on one of the respective substrates which are arranged to face each other with liquid crystal disposed therebetween, a plurality of juxtaposed gate signal lines and a plurality of juxtaposed drain signal lines which cross the respective gate signal lines are formed, regions surrounded by these respective signal lines constitute pixel regions, and each pixel region includes a switching element which is operated in response to a scanning signal received from the gate signal line and a pixel electrode to which a video signal is supplied from the drain signal line through the switching element, the pixel electrode is constituted of a first pixel electrode formed of a non-light transmissive conductive layer, which is formed in a light reflective region formed surrounding a light transmissive region, and a second pixel electrode of a light transmissive conductive layer which is formed on the light reflective region, the second pixel electrode is positioned as a lower layer with respect to an insulation film, a hole is formed in the insulation film in a region corresponding to the light transmissive region so as to expose the second pixel electrode, the first pixel electrode is formed in the light reflective region of the insulation film, a light shielding film, which is positioned as a layer below the insulation film, is provided to at least a portion corresponding to a side wall surface of the hole formed in the insulation film and, the light shielding film is formed as a layer below the second pixel electrode, and, at the same time, there exists a portion where the light shielding layer is not formed at a part of the portion corresponding to the side wall surface of the hole formed in the insulation film.

Means 7.

The liquid crystal display device according to the present invention is, for example, characterized in that on one of the respective substrates which are arranged to face each other with liquid crystal disposed therebetween, a plurality of juxtaposed gate signal lines and a plurality of juxtaposed drain signal lines which cross the respective gate signal lines are formed, regions surrounded by these respective signal lines constitute pixel regions, and each pixel region includes a switching element which is operated in response to a scanning signal received from the gate signal line and a pixel electrode to which a video signal is supplied from the drain signal line through the switching element, the pixel electrode is constituted of a first pixel electrode formed of a non-light transmissive conductive layer which is formed in a light reflective region surrounding a light transmissive region and a second pixel electrode formed of a light transmissive conductive layer which is formed on the light reflective region, the second pixel electrode is positioned as a lower layer with respect to an insulation film, a hole is formed in the insulation film in a region corresponding to the light transmissive region so as to expose the second pixel electrode, the first pixel electrode is formed in the light reflective region of the insulation film, a light shielding film which is positioned as a layer below the insulation film is provided to at least a portion corresponding to a side wall surface of the hole formed in the insulation film and, the light shielding film is made of a material similar to the material of the gate signal lines and is formed as a layer below the second pixel electrode, and, at the same time, there exists a portion where the light shielding layer is not formed at a part of the portion corresponding to the side wall surface of the hole formed in the insulation film and the portion includes a portion which is close to the switching element.

It is needless to say that the present invention is not limited to the above-mentioned examples, and that various modifications can be made without departing from the technical concept of the present invention.

DETAILED DESCRIPTION OF THE INVENTION

Hereinafter, various embodiments of the liquid crystal display device according to the present invention will be explained in conjunction with the drawings.

Embodiment 1

Figure 1:
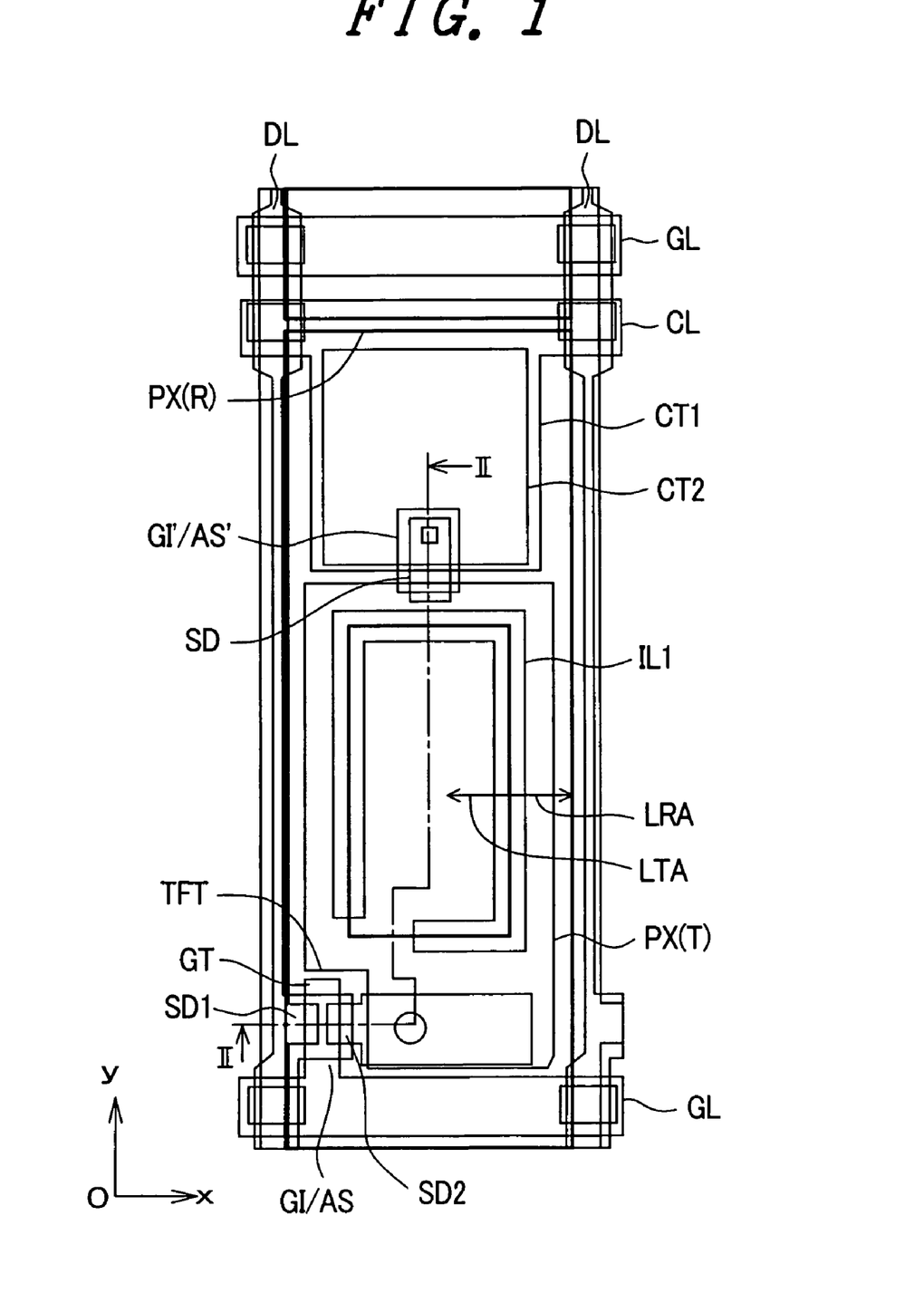
FIG. 1 is a diagrammatic plan view showing one embodiment of a pixel of a liquid crystal display device according to the present invention.
Figure 2:
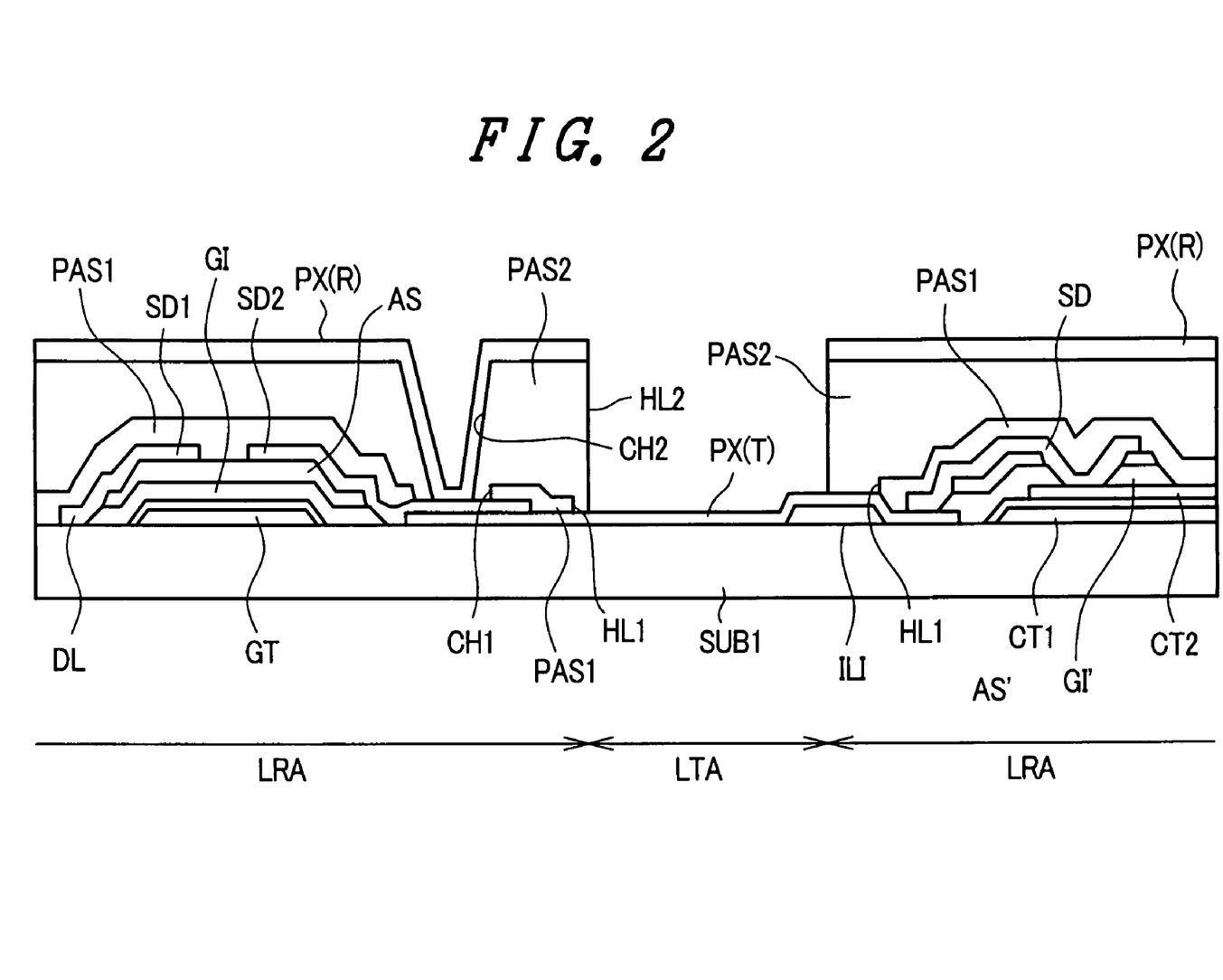
FIG. 2 is a cross-sectional view taken along a line II-II in FIG. 1.

FIG. 1 is a plan view showing one embodiment of the constitution of a pixel of a liquid crystal display device according to the present invention. Further, FIG. 2 is a cross-sectional view taken along a line II-II in FIG. 1.

Pixels as seen in these drawings are formed within regions which are defined by gate signal lines GL, which extend in the x direction and are juxtaposed in the y direction, and drain signal lines DL, which extend in the y direction and are juxtaposed in the x direction (pixel regions).

First, the above-mentioned gate signal lines GL are formed on the liquid-crystal-side surface of the transparent substrate SUB1. The gate signal line GL has a portion which is extended slightly to the pixel region side and this extended portion forms a gate electrode GT of a thin film transistor TFT, as will be explained in more detail later. This gate signal line GL and the gate electrode GT are made of, for example, aluminum (Al) or an alloy thereof and an anodized film formed by anodizing the surface of the aluminum or alloy.

Further, a capacitive signal line CL, extending in the x direction in the drawing, is formed in the pixel region, and this capacitive signal line CL is arranged in the vicinity of the gate signal line GL, which is positioned, for example, in the upper portion of the drawing. This capacitive signal line CL has a portion which extends comparatively largely to the center side of the pixel region, and the extended portion forms an electrode CT1, which constitutes one part of the capacitive element Cstg, which will be explained later. This capacitive signal line CL and the electrode CT1 are formed, for example, in the same fabrication step as used for fabrication of the above-mentioned gate signal line GL, and the materials thereof are also made of aluminum (Al) or an alloy thereof and an anodized film formed by anodizing a surface of the material.

Further, although the pixel according to this embodiment is configured such that, for example, a light transmissive region LTA is formed in an approximate center of the region and a light reflective region LRA is formed to surround the light transmissive region LTA, in this embodiment, a light shielding layer ILI having a given width is formed at a location corresponding to a boundary portion between the light transmissive region LTA and the light reflective region LRA. This light shielding layer ILI is formed in the same fabrication step as used in fabrication of the above-mentioned gate signal line GL, for example, and the material of the light shielding layer ILI is aluminum (Al) or an alloy thereof, wherein no anodized film is formed on a surface of the light shielding layer ILI. This is because the light shielding layer ILI is formed in an island shape independently in the pixel region, and, hence, it is difficult to anodize the light shielding layer ILI. However, it is not a drawback for the light shielding layer ILI that no anodized film is formed on the surface of the light shielding layer ILI. The functions of this light shielding layer will be explained in more detail later.

A light transmissive conductive layer made of, for example, ITO (Indium Tin Oxide), ITZO (Indium Tin Zinc Oxide), IZO (Indium Zinc Oxide), $SnO_2$ (Tin Oxide), $In_2O_3$ (Indium Oxide) or the like is formed in an approximately half of the pixel region at the thin film transistor TFT side. As will be clearly understood from an explanation which will be provided later, the light transmissive conductive layer is formed such that the light transmissive conductive layer covers the light transmissive region LTA sufficiently to provide the function of a pixel electrode PX (T) in the light transmissive region LTA.

Further, for example, simultaneously with the formation of the light transmissive conductive layer; a light transmissive conductive layer is also formed on an upper surface of an electrode CT1 of the capacitive element Cstg, and this light transmissive conductive layer constitutes another electrode CT2 of the capacitive element Cstg. In this case, between these electrodes CT1 and CT2, there is an anodized film disposed on a surface of the electrode CT1, and the anodized film constitutes one of dielectric films of the capacitive element Cstg.

Further, a sequential laminated body formed of a gate insulation film GI and a semiconductor layer AS, which is made of amorphous Si, is formed such that the sequential laminated body extends over the gate electrode GT. The gate electrode GT, the gate insulation film GI and the semiconductor layer AS are members which constitute a thin film transistor TFT. That is, by forming a drain electrode and a source electrode on the semiconductor layer AS, a MIS (Metal Insulator Semiconductor) transistor having a so-called inversely staggered structure is formed.

Further, the sequential laminated body formed of the gate insulation film GI and the semiconductor layer AS extends over the whole area of the region in which the drain signal line DL is formed. Accordingly, in the formation of the drain signal line DL, the drain signal line DL is formed on a portion having no stepped portion. This can prevent the occurrence of a broken step in the drain signal line DL, which may be caused by the stepped portion.

Further, in a portion where a conductive state is established between the light transmissive conductive layer constituting the pixel electrode PX(T) in the light transmissive region LTA and the light transmissive conductive layer constituting the electrode CT2 of the capacitive element Cstg, a sequential laminated body formed of a gate insulation film GI' and a semiconductor layer AS' is formed, and the above-mentioned conductive state is established through a hole formed in the sequential laminated body. In this case, the conductive state is, for example, established by a conductive layer SD, which is made of the same material as that of the drain signal line DL at the time of forming the drain signal line DL, which will be formed in a following step, for example. The reason that the conductive state is established between the light transmissive conductive layer constituting the pixel electrode PX (T) and the light transmissive conductive layer constituting the electrode CT1 of the capacitive element Cstg using such a comparatively complicated construction is to relax the stress generated due to the relationship with materials constituting the electrode CT1 of the capacitive element Cstg or the like.

Here, the gate insulation film GI' and the semiconductor layer AS' are formed simultaneously with the formation of the gate insulation film GI and the semiconductor layer AS, in the region where the thin film transistor TFT is formed, for example.

Then, the drain signal lines DL, which extend in the y direction and are juxtaposed in the x direction in the drawing, are formed. As mentioned above, these drain signal lines DL are formed on the sequential laminated bodies of the gate insulation films GI and the semiconductor layers AS, and, hence, the drain signal lines DL can be formed so as to obviate the possibility of occurrence of broken steps at stepped portions because of the flatness of the sequential laminated bodies.

An extended portion, which extends to a position above the semiconductor layer AS, is formed at a portion of the drain signal line DL, and this extended portion is configured to form the drain electrodes SD1 of the thin film transistor TFT. Further, along with the formation of the drain signal line DL, the source electrode SD2 is formed in a spaced-apart manner from the drain electrode SD1 by a length corresponding to a channel length of the thin film transistor TFT. The source electrode SD2 has an extended portion which extends to a position above the pixel electrode PX (T). This extended portion also serves to establish a connection with the pixel electrode PX (R), as will be explained later.

As described previously, during the formation of the drain signal lines DL, the conductive layer SD is formed for establishing the conductive state between the light transmissive conductive layer constituting the pixel electrode PX (T) in the light transmissive region LTA and the light transmissive conductive layer constituting the electrode CT2 of the capacitive element Cstg.

Then, on a surface of the transparent substrate SUB1 having such a constitution, an inorganic protective film PAS1, which constitutes one of the protective films PAS, is formed using a silicon nitride film or the like, for example. In this inorganic protective film PAS1, in the vicinity of the thin film transistor TFT, a hole CH1 which is provided to ensure contact with the pixel electrode PX (R), as will be explained later, and an opening portion HL1 which is used to expose the light transmissive region LTA are formed.

Further, on a surface of the inorganic protective film PAS1, an organic protective film PAS2 is formed using a material such as resin or the like, for example. The above-mentioned inorganic protective film PAS1 and this organic protective film PAS2 collectively constitute a protective film PAS for mainly obviating direct contact between the thin film transistor TFT and the liquid crystal. This is provided for decreasing the dielectric constant of the protective film PAS as a whole.

In the organic protective film PAS2, at a portion thereof where the hole CH1 is formed in the inorganic protective film PAS1, a hole CH2 is formed, which is smaller than the hole CH1 and shares the same central axis with the hole CH1. Further, in the organic protective film PAS2, at a portion where the opening portion HL1 is formed in the inorganic protective film PAS1, an opening portion HL2, is formed, which is smaller than the opening portion HL1 and shares the same central axis with opening portion HL1.

Here, the opening portion HL2 formed in the organic protective film PAS2 constitutes the light transmissive region LTA in the pixel region and the pixel electrode PX (T), which is exposed through the opening portion HL2, functions as the pixel region PX in the light transmissive region LTA.

Further, the reason why the opening portion HL2 is formed in the region corresponding to the light transmissive region LTA of the organic protective film PAS2 is to make the length of an optical path of light passing through the liquid crystal in the light transmissive region LTA and the length of an optical path of light passing through the liquid crystal in the light reflective region LRA substantially equal.

Further, on a surface of the organic protective film PAS2, that is, on the region corresponding to the light reflective region LRA, the pixel electrode PX (R), which also functions as a reflector, is formed. The pixel electrode PX (R) is made of, for example, Al, an alloy thereof or a laminated body including Al or the alloy. In any case, the pixel electrode PX (R) is made of a material having a favorable reflective efficiency (reflectance), while, when the pixel electrode PX (R) is formed in the laminated body, the pixel electrode PX (R) constitutes a top layer of the laminated body.

Further, the pixel electrode PX (R) is connected to the source electrode SD2 of the thin film transistor TFT through the hole CH2 formed in the protective film PAS2 and is configured to have a potential equal to that of the pixel electrode PX (T) in the light transmissive region LTA.

Further, the formation of the pixel electrode PX (R) in the light transmissive region LTA, that is, in the opening portion of the protective film PAS2, is obviated. Accordingly, the pixel electrode PX (R) formed in the light reflective region LRA and the pixel electrode PX (T) formed in the light transmissive region LTA, as seen in plan view, are defined by a side wall surface of the opening portion of the protective film PAS2.

Still further, among peripheral sides of the pixel electrode PX (R), respective sides which are arranged parallel to the y direction in the drawing are overlapped with the drain signal lines DL, and, at the same time, respective sides which are arranged parallel to the x direction in the drawing are overlapped with the capacitive signal lines CL. This arrangement is provided because, by forming the pixel electrode PX (R) such that the pixel electrode PX (R) slightly extends over the pixel region, the numerical aperture of the pixels can be enhanced.

Further, a parasitic capacitance between the pixel electrode PX (R) and the drain signal line DL or the capacitive signal line CL causes no significant problems because the protective film PAS1 among the protective films PAS is constituted of an organic material having a comparatively small dielectric constant.

Further, the pixel electrode PX (R) is also configured to function as an electrode having the protective films PAS1, PAS2 as dielectric films between the pixel electrode PX (R) and the electrode CT2 in the region where the capacitive elements are formed. Accordingly, the capacitive element Cstg having a two-stage constitution is formed between the capacitive signal line CL and the pixel electrode PX (R), and, hence, although the occupied region of the pixel electrode PX (R) is small, the pixel electrode PX (R) can obtain a large capacity.

Further, on a surface of the transparent substrate SUB1 having such a constitution, an orientation film is formed, and this orientation film determines the initial orientation of molecules of the liquid crystal and is brought into direct contact with the liquid crystal.

In the liquid crystal display device having such a constitution, the light shielding layer ILI is formed, as shown in FIG. 1, on the boundary portion between the light transmissive region LTA and the light reflective region LRA.

The light transmissive region LTA is constituted of a portion where an opening is formed in the protective film PAS and the light reflective region LRA is constituted of a portion where the protective film PAS is formed. Accordingly, the boundary portion of the light transmissive region LTA and the light reflective region LRA corresponds to the side wall surface of the opening portion of the protective film PAS, and, hence, the orientation of the liquid crystal is not sufficiently achieved in this boundary portion. This is because it is difficult at this location to perform the rubbing treatment of the orientation film with accuracy.

Accordingly, when a black display is produced in the light transmissive region LTA, a complete black display is not produced on the peripheral portion thereof, and a frame-like pattern is recognized by the naked eye. In view of the above, the light shielding layer ILI is formed on this portion for overcoming the above-mentioned drawback.

Figure 3:
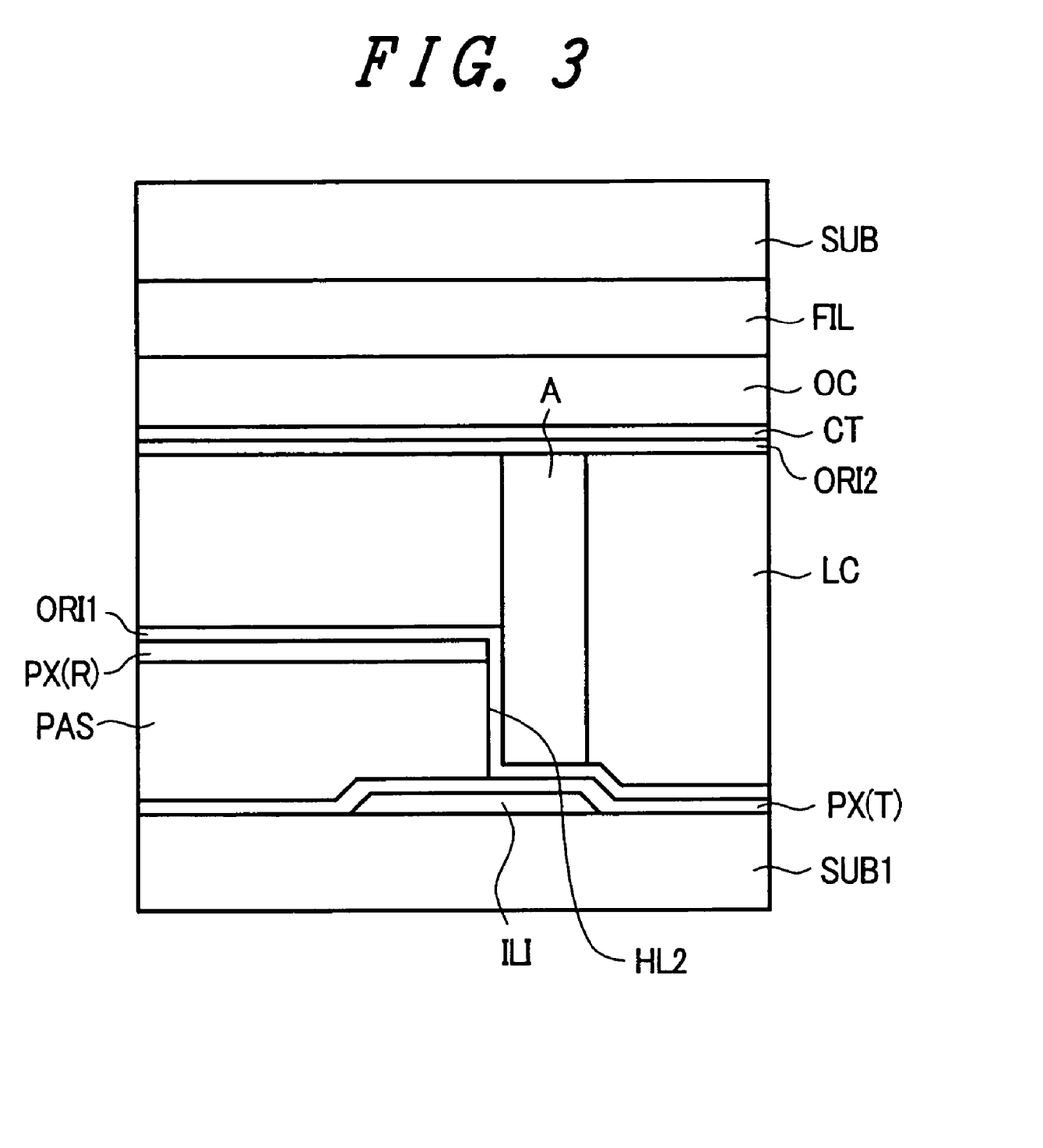
FIG. 3 is a cross-sectional diagram illustrating an advantageous effect of the present invention.

FIG. 3 is a view showing a cross section at the boundary portion of the light transmissive region LTA and the light reflective region LRA. An orientation film ORI1, which is arranged to be in contact with the liquid crystal, cannot receive the appropriate rubbing treatment on the side wall surface of the opening portion HL2 formed in the organic protective film PAS2 and the bottom surface in the vicinity of the side wall surface. Accordingly, the liquid crystal (shown as A in the drawing) in this portion cannot exhibit the proper behavior, and, hence, for example, when a black display is produced in the light transmissive region LTA, a complete black display cannot be obtained at that location.

Accordingly, the light shielding layer ILI is formed on the portion where proper rubbing treatment cannot be performed. In the steps of fabricating the liquid crystal display device, it is difficult to form the light shielding layer only on the region where the appropriate rubbing treatment cannot be performed. In the cross-sectional view shown in FIG. 3, considering the displacement of the position which occurs during manufacture of the liquid crystal display device, an end portion of the opening portion HL2 of the organic protective film PAS2 is arranged on the light shielding layer ILI. The light shielding layer ILI is formed such that the light shielding layer ILI extends over the light reflective region LRA and the light transmissive region LTA, and, hence, it is possible to ensure light shielding in the region where the appropriate rubbing treatment cannot be performed. Further, in the liquid crystal display device shown in FIG. 3, since the protective film PAS2 is formed over the light shielding layer ILI, the light shielding region can be narrowed. Accordingly, the luminance of a display screen in a light transmissive mode, as well as in a light reflective mode, can be enhanced.

FIG. 3 also shows the transparent substrate SUB2 which is arranged over the transparent substrate SUB1, with the liquid crystal LC disposed therebetween. Color filters FIL, an overcoat film OC, a counter electrode CT and an orientation film ORI2 are formed on a liquid crystal side surface of the transparent substrate SUB2.

Further, in this embodiment, the light shielding layer ILI is constituted such that the light shielding layer ILI is not formed in the vicinity of the thin film transistor TFT.

The reason why this constitution is adopted is that, first, by forming the portion where the light shielding layer ILI is not formed on the boundary portion between the light transmissive region LTA and the light reflective region LRA, the region is formed in which the pixel electrode PX (T) formed of the light transmissive conductive layer does not extend over the light shielding layer ILI. The pixel electrode PX (T) has characteristics such that the pixel electrode PX (T) is easily broken at a stepped portion. This constitution can prevent the electrical disconnection between the pixel electrode PX (T) formed in the light transmissive region LTA and the source electrode SD2 of the thin film transistor TFT, which is caused by the broken step.

Further, another reason why the portion where the light shielding layer ILI is not formed is arranged particularly close to the thin film transistor TFT is to space the light shielding layer ILI and the gate electrode GT of the thin film transistor TFT further apart from each other eventually so as to obviate an electrical connection between them.

Embodiment 2

Figure 4:
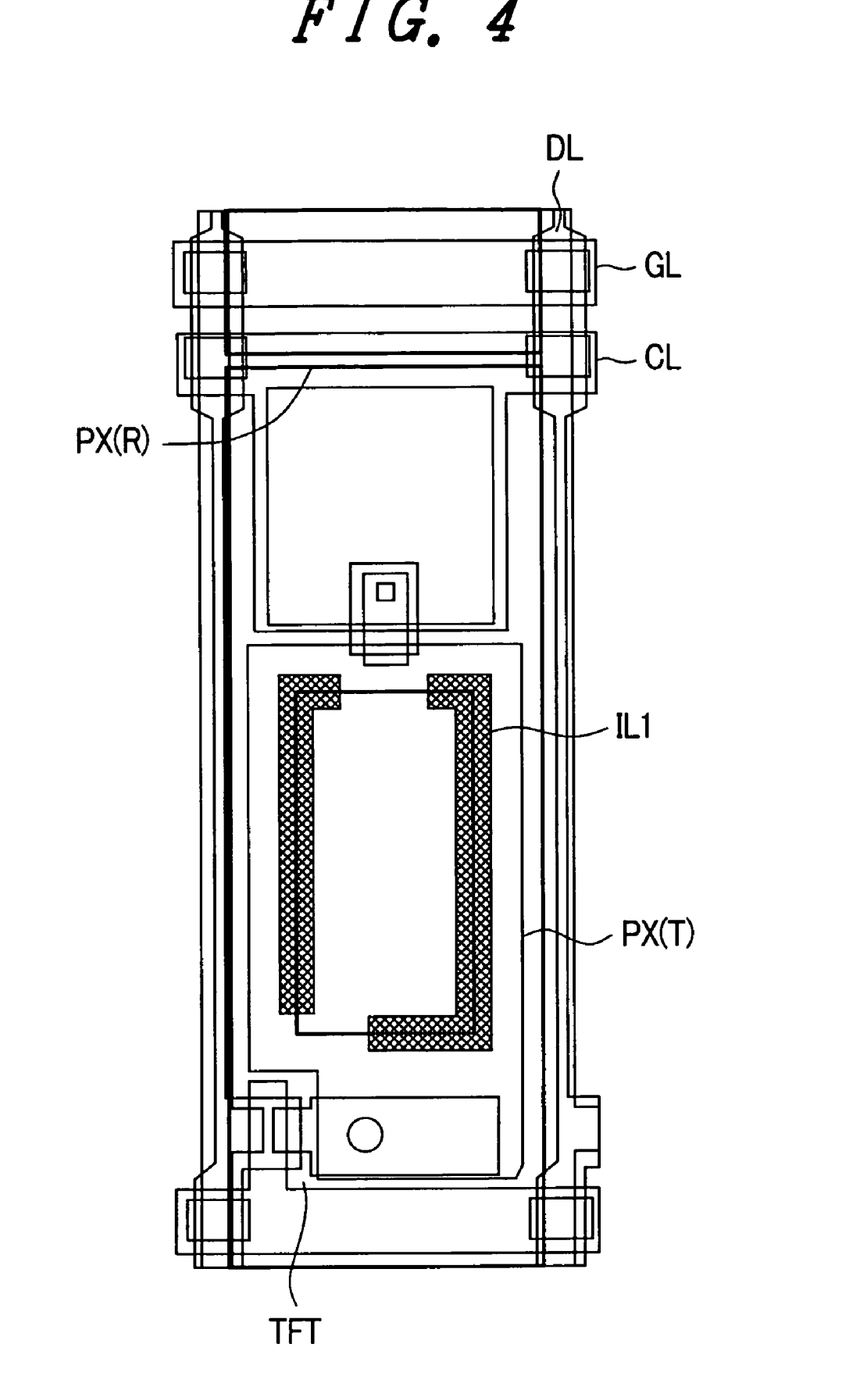
FIG. 4 is a diagrammatic plan view showing another embodiment of a pixel of the liquid crystal display device according to the present invention.

FIG. 4 is a plan view showing another embodiment of the pixel of the liquid crystal display device according to the present invention, similar tot hat of FIG. 1.

The constitution which makes this embodiment different from the embodiment shown in FIG. 1 lies in the fact that the light shielding layer ILI is formed not only in the vicinity of the thin film transistor TFT within the boundary portion between the light transmissive region LTA and the light reflective region LRA, but also in other portions within such a boundary portion, for example, in the vicinity of the capacitive element Cstg.

This constitution is provided for eliminating, with high probability, the drawback that occurs when the pixel electrode PX (T) is formed by extending it over the light shielding layer ILI, such that it is broken at the stepped portion of the light shielding layer ILI.

Embodiment 3

Figure 5:
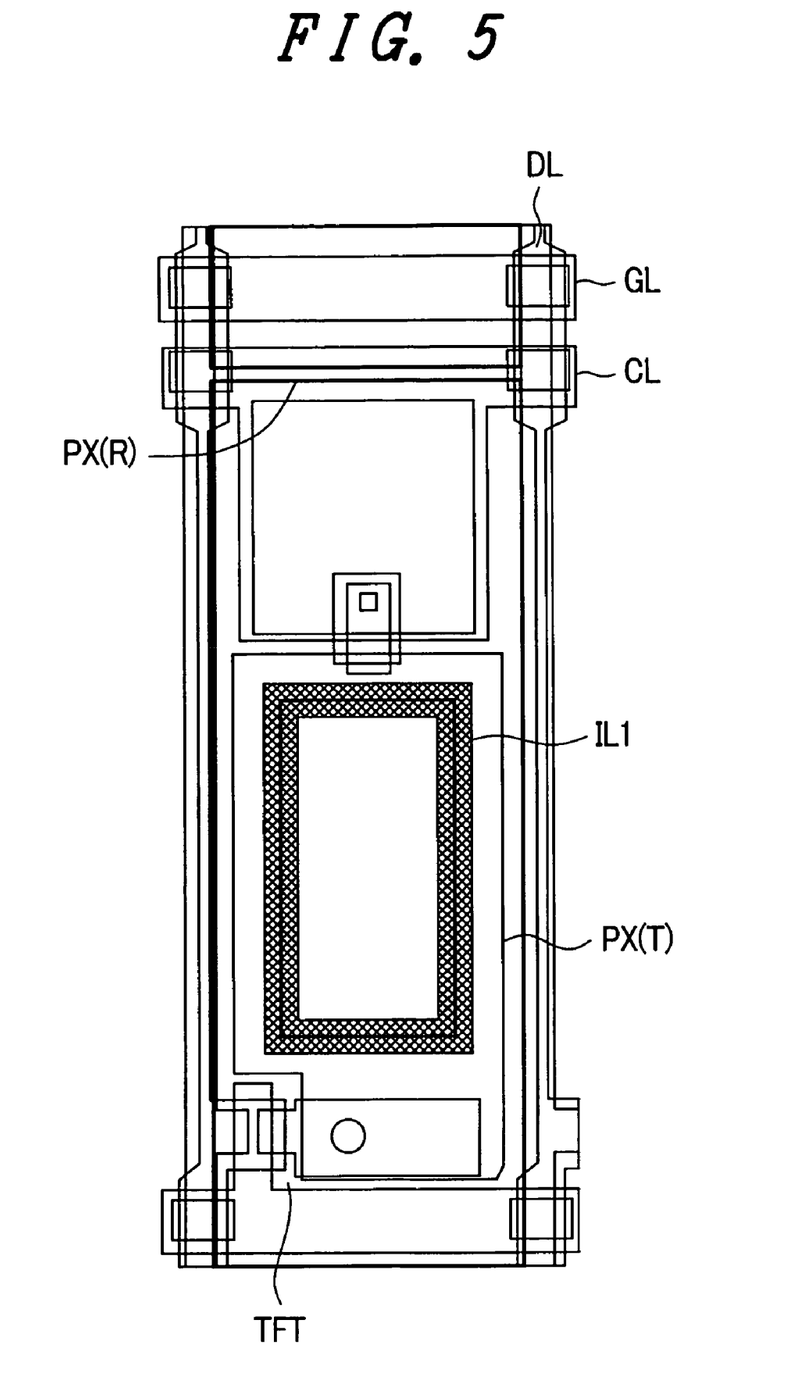
FIG. 5 is a diagrammatic plan view showing another embodiment of a pixel of the liquid crystal display device according to the present invention.

FIG. 5 is a plan view showing another embodiment of a pixel of the liquid crystal display device according to the present invention and it shows an arrangement similar to that of FIG. 1.

The constitution which makes this embodiment different from the embodiment shown in FIG. 1 lies in the fact that the light shielding layer ILI is formed continuously along the whole area of the boundary portion between the light transmissive region LTA and the light reflective region LRA.

This embodiment is based on the understanding that, if the drawback which is generated when the pixel electrode PX (T) is formed to extend over the light shielding layer ILI can be eliminated by any means, it is unnecessary for the boundary portion between the light transmissive region LTA and the light reflective region LRA to have a portion where the light shielding layer is not formed along that boundary.

Here, as the means for eliminating such a drawback, for example, by forming the light shielding layer ILI above the pixel electrode PX (T), there is no fear that the pixel electrode PX (T) will be broken at the stepped portion, and, hence, in this case, the light shielding layer ILI can be formed continuously along the whole boundary portion between the light transmissive region LTA and the light reflective region LRA.

Embodiment 4

Figure 6:
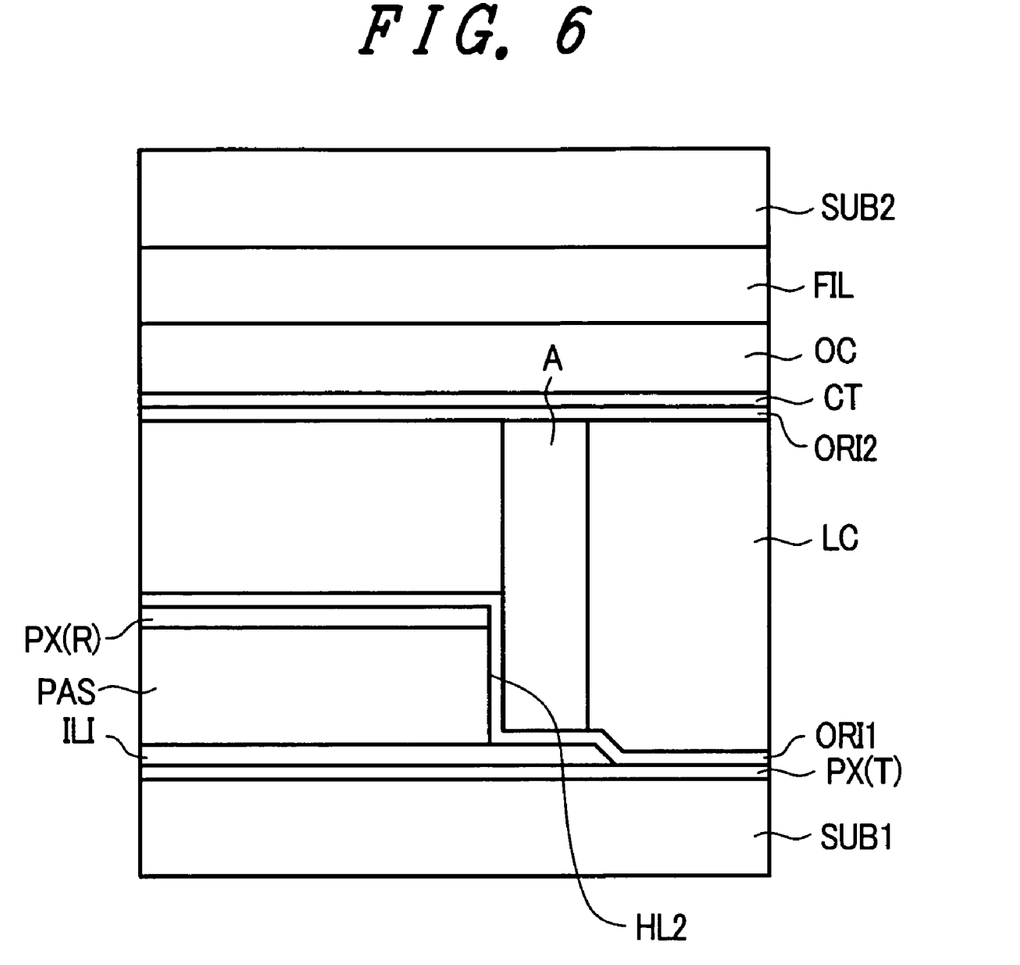
FIG. 6 is a cross-sectional diagram showing another embodiment of a pixel of the liquid crystal display device according to the present invention.

FIG. 6 is a view showing another embodiment of a pixel of the liquid crystal display device according to the present invention and it shows an arrangement similar to that of FIG. 3.

The constitution which makes this embodiment different from the embodiment shown in FIG. 3 lies in the fact that the light shielding film ILI extends over the light reflective region LRA. In other words, the light shielding film ILI is formed such that the light shielding film ILI extends outwardly from the light transmissive region LTA.

This embodiment is made based on the understanding that the extended portion forms a portion of the light reflective region LRA, and, hence, the extended portion exerts no influence on the display.

Embodiment 5

Although the light shielding layer ILI is formed on the transparent substrate SUB1 side in each of the above-mentioned embodiments, the present invention is not limited to such a constitution. That is, it is also possible to achieve substantially the same advantageous effects by forming the light shielding layer ILI on the corresponding portion of the transparent substrate SUB2 side.

Embodiment 6

In each of the above-mentioned embodiments, the light transmissive region LTA is positioned at the center of the pixel region and the light reflective region LRA is formed around the periphery of the light transmissive region LTA. However, it is needless to say that, for example, using an imaginary line which extends in the x direction in the drawing as a boundary, even when the light reflective region LRA is formed above the boundary and the light transmissive region LTA is formed below the boundary, the present invention is applicable to the boundary portion of the light reflective region LRA and the light transmissive region LTA.

As can be clearly understood from the foregoing explanation, in the liquid crystal display device according to the present invention, the occurrence of a frame-like luminance difference in the portion which surrounds the light transmissive region can be prevented.

The invention claimed is:

1. A display device being characterized in that:
on one of respective substrates which are arranged to face each other with liquid crystal therebetween, a plurality of juxtaposed gate signal lines and a plurality of juxtaposed drain signal lines which cross the respective gate signal lines are formed, regions surrounded by these respective signal lines constitute pixel regions, and each pixel region includes a switching element which is operated in response to a scanning signal from the signal line and a pixel electrode to which a video signal is supplied from the drain signal line through the switching element, the pixel electrode is constituted of a first pixel electrode formed of a light transmissive conductive layer which is formed in a light transmissive region which constitutes one region after partitioning the pixel region and a second pixel electrode formed of a non-light transmissive conductive film which is formed in a light reflective region which constitutes the other region after partitioning the pixel region, the first pixel electrode is positioned as a lower layer with respect to an insulation film, a hole is formed in the insulation film in a region corresponding to the light transmissive region so as to expose the first pixel electrode, the second pixel electrode is formed in the light reflective region of the insulation film, and a light shielding film which is positioned as a layer below the insulation film is provided to at least a portion corresponding to a side wall surface of the hole formed in the insulation film.

2. A display device according to the claim 1, wherein the light shielding film is made of the material equal to the material of the gate signal lines.

3. A display device being characterized in that:
on one of respective substrates which are arranged to face each other with liquid crystal therebetween, a plurality of juxtaposed gate signal lines and a plurality of juxtaposed drain signal lines which cross the respective gate signal lines are formed, regions surrounded by the respective signal lines constitute pixel regions, and each pixel region includes a switching element which is operated in response to a scanning signal from the gate signal line and a pixel electrode to which a video signal is supplied from the drain signal line through the switching element, the pixel electrode is constituted of a first pixel electrode formed of a non-light transmissive conductive layer which is formed in a light reflective region formed surrounding a light transmissive region and a second pixel electrode formed of a light transmissive conductive layer which is formed on the light reflective region, the second pixel electrode is positioned as a lower layer with respect to an insulation film, a hole is formed in the insulation film in a region corresponding to the light transmissive region so as to expose the second pixel electrode, the first pixel electrode is formed in the light reflective region of the insulation film, a light shielding film which is positioned as a layer below the insulation film, is provided to at least a portion corresponding to a side wall surface of the hole formed in the insulation film and, the light shielding film is formed as a layer below the second pixel electrode and, at the same time, there exists a portion where the light shielding layer is not formed at a part of the portion corresponding to the side wall surface of the hole formed in the insulation film.

4. A display device being characterized in that:
on one of respective substrates which are arranged to face each other with liquid crystal therebetween, a plurality of juxtaposed gate signal lines and a plurality of juxtaposed drain signal lines which cross the respective gate signal lines are formed, regions surrounded by these respective signal lines constitute pixel regions, and each pixel region includes a switching element which is operated in response to a scanning signal from the gate signal line and a pixel electrode to which a video signal is supplied from the drain signal line through the switching element, the pixel electrode is constituted of a first pixel electrode formed of a non-light transmissive conductive layer which is formed in a light reflective region formed surrounding a light transmissive region and a second pixel electrode formed of a light transmissive conductive layer which is formed on the light reflective region, the second pixel electrode is positioned as a lower layer with respect to an insulation film, a hole is formed in the insulation film in a region corresponding to the light transmissive region so as to expose the second pixel electrode, the first pixel electrode is formed in the light reflective region of the insulation film, a light shielding film which is positioned as a layer below the insulation film is provided to at least a portion corresponding to a side wall surface of the hole formed in the insulation film and the light shielding film is made of a material equal to a material of the gate signal lines and is formed as a layer below the second pixel electrode and, at the same time, there exists a portion where the light shielding layer is not formed at a part of the portion corresponding to the side wall surface of the hole formed in the insulation film and the portion includes a portion which is close to the switching element.

* * * * *